No. 745,562. PATENTED DEC. 1, 1903.
A. E. BERGEY.
CALCULATING MACHINE.
APPLICATION FILED APR. 8, 1903.
NO MODEL. 2 SHEETS—SHEET 1.

Witnesses.
George M. Newmyer
George B. Lewis

Inventor.
Aaron E. Bergey

No. 745,562. PATENTED DEC. 1, 1903.
A. E. BERGEY.
CALCULATING MACHINE.
APPLICATION FILED APR. 8, 1903.
NO MODEL. 2 SHEETS—SHEET 2.

Witnesses. Inventor.

No. 745,562. Patented December 1, 1903.

UNITED STATES PATENT OFFICE.

AARON E. BERGEY, OF AVALON, PENNSYLVANIA.

CALCULATING-MACHINE.

SPECIFICATION forming part of Letters Patent No. 745,562, dated December 1, 1903.

Application filed April 8, 1903. Serial No. 151,678. (No model.)

*To all whom it may concern:*

Be it known that I, AARON E. BERGEY, a citizen of the United States, residing at Avalon, in the county of Allegheny and State of Pennsylvania, have invented a new and useful Calculating-Machine, of which the following is a specification.

My invention relates to improvements in calculating-machines in which a graduated scale, and more especially a logarithmic scale, is used in connection with an index movable thereon and a registering mechanism adapted to register any portion of the movement of the index on the scale.

The object of my invention is to provide a registering mechanism simple in construction and accurate in results. I attain this object by means shown in the accompanying drawings, in which—

Figure 3:
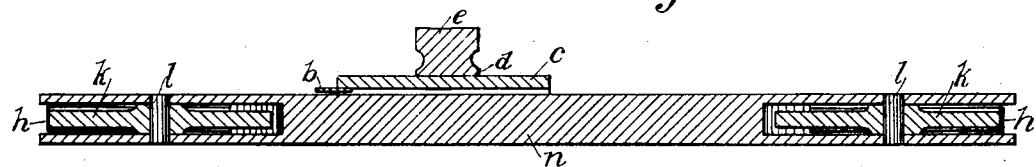
Figure 4:
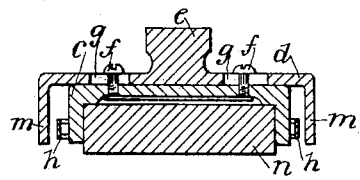
Figure 5:
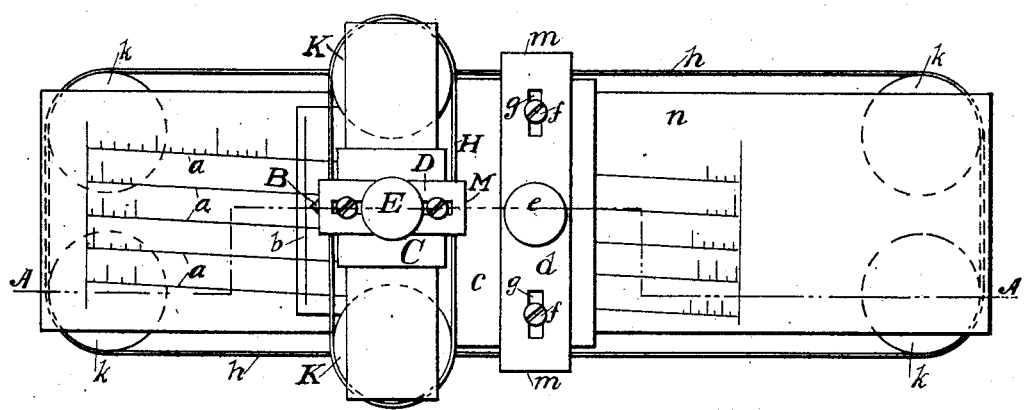
Figure 6:
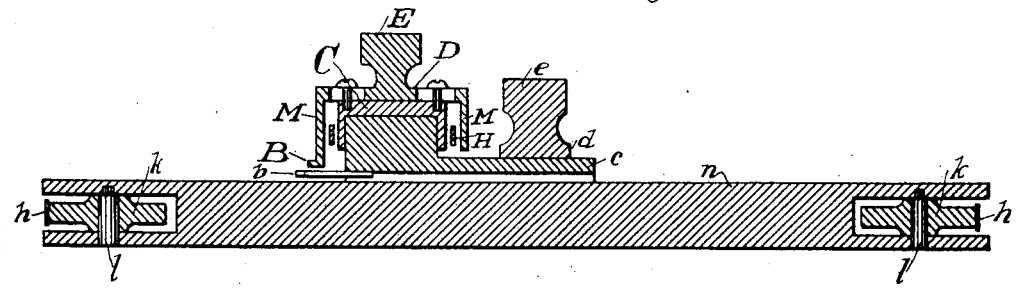

Figures 1, 2, 3, and 4 show a registering mechanism adapted to register the motion of the index along the line or lines of the logarithmic scale; and Fig. 5 and Fig. 6 show a registering mechanism adapted to register the motion of the index both along and across the lines of the scale.

Similar letters refer to similar parts throughout the several views.

Figure 1:
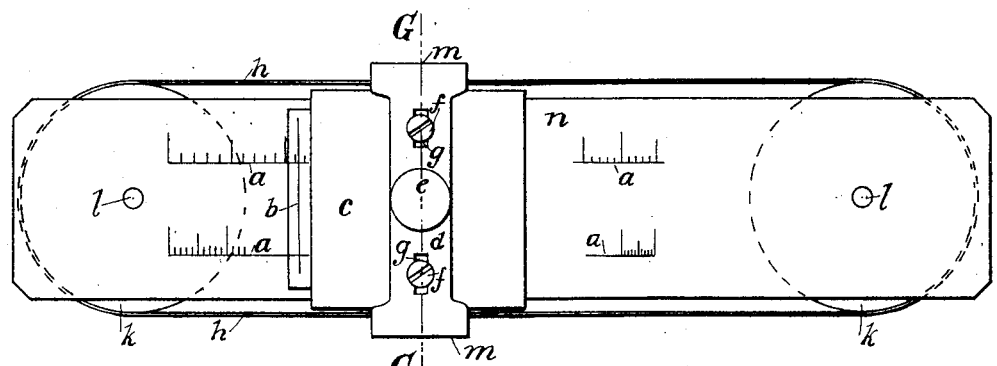
Figure 2:
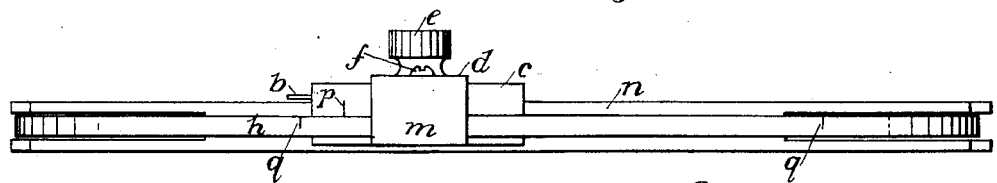

Fig. 1 is a plan, Fig. 2 a side elevation, Fig. 3 a longitudinal vertical section through the center, and Fig. 4 a section on the line G G, of the calculating-machine, having a simple registering mechanism. Fig. 5 is a plan, and Fig. 6 a section, on the line A A of the calculating-machine, having a compound registering mechanism.

A logarithmic scale or scales $a$ is inscribed or mounted on a frame $n$. An index $b$ is attached to a slide $c$, adapted to slide along the frame $n$. An endless band $h$ is mounted on the frame $n$ by means of pulleys $k$, which can turn on shafts $l$. On this band are indices $q$. A grip-slide $d$ is mounted on the slide $c$ and has jaws $m$ and a knob $e$. The screws $f$ are fastened to the slide $c$ through slots $g$ in the grip-slide $d$. It will be seen that when the grip-slide $d$ is pushed sidewise by means of the knob $e$ the jaw $m$ will push the endless band $h$ against the slide $c$. Thus when the slide $c$ and index $b$ are moved along the scale $a$ on the frame $n$ the band $h$ will be taken along and will register the motion of the index $b$ along the scale $a$; also, that when the grip-slide is put out of action the index $b$ and slide $c$ can be moved along the scale $a$ without having their motion registered by the band $h$. A mark $p$ on the slide $c$ serves to show when the slide $c$ and index $b$ come to initial position on the band $h$. It will be seen that by this means the operations of multiplication and division by any numbers on the scale can be readily performed.

For example, to perform the operation, thirty multiplied by thirty-five: The slide $c$ and grip-slide $d$ are moved along the band $h$ until $p$ comes opposite $q$. Then the grip-slide is put in action, (so as to carry with it the band $h$,) and the index $b$ is moved to "30." Then the grip-slide is put out of action (so as not to carry with it the band $h$) and the index $b$ moved to unity. (By "unity" here is meant either end of the scale, as "10" or "100.") Then the grip-slide is put in action and the index $b$ moved to "35." Then the grip-slide is put out of action and the index $b$ moved until $p$ comes opposite $q$, when the index $b$ will be opposite the product of thirty and thirty-five.

I prefer to provide a spring to hold the grip-slide $d$ normally out of action and to put it out of action after the pressure or push on the knob $e$ is released.

In Figs. 5 and 6 is shown a calculating-machine where the logarithmic scale $a$ is arranged on a succession of lines. Those parts having similar letters perform the same functions as already described herein. If there are only two or three lines of the scale, the operator can determine mentally which of the lines the answer is to be found on; but if the scale is arranged on a large number of lines I prefer to provide an index B, adapted to travel across the lines of the scale, together with a registering mechanism for registering any desired part of the motion of B across the lines of the scale. A slide C is adapted to slide crosswise on a suitable guide on the slide $c$. On the slide C is mounted a grip-slide D, having jaws M. Also on the slide $c$ is mounted an endless band H, which can travel on pulleys K in a manner exactly similar to that in which the band $h$ travels on the frame $n$. The slide C and band H have index-marks similar to those on the slide $c$ and band $h$.

The method of operation will be readily seen. For example, to multiply eighty-six by thirty-four: The index $b$ is moved (with the grip-slide $d$ out of action) until the index-mark on the slide $c$ comes opposite the index-mark on the band $h$. Then the index B is moved until the index-mark on the slide C comes opposite the index-mark on the band H. Then the index $b$ is moved to "86," (the grip-slide $d$ being held in action.) Then the index B is moved to "86," (the grip-slide D being held in action.) Then the indices $b$ and B are moved to unity, (both grip-slides being out of action.) Then the index $b$ is moved to "34," (the grip-slide $d$ being in action,) and the index B is moved to "34," (the grip-slide D being in action.) Then the index $b$ is moved (the grip-slide $d$ being out of action) until the index-mark on the slide $c$ comes opposite the index-mark on the band $h$, and the index B is moved (the grip-slide D being out of action) until the index-mark on the slide C comes opposite the index-mark on the band H, when both indices $b$ and B will be opposite the product of eighty-six and thirty-four.

The lines of the scale $a$ are placed at an angle with the sides of the frame $n$, so that the end of each line and the beginning of the next line are the same distance from the sides of the frame $n$.

I prefer to have the band $h$ of such length as to be an exact multiple of the length of one of the lines of the scale, the indices $q$ being of course a distance apart equal to the length of one of the lines of the scale. I prefer to have the band H of such length as to be an exact multiple of the distance across the lines of the scale from unity to unity, with index-marks thereon the same distance apart.

While any suitable device—such as, for example, the edge of the slide $c$—may be used for the index $b$, yet I prefer to make the index $b$ of a light mark or cut in a transparent substance, such as glass or celluloid, since this enables the operator to estimate more closely the position of the index when it comes opposite a point between the graduation-marks on the scale.

I prefer to have the grips $d$ and D made so that either side of the bands can be grasped, thus allowing of the registering mechanism to be reversed in its action.

What I claim as my invention, and desire to secure by Letters Patent, is—

1. In a calculating-machine, in combination, a graduated scale, an index movable thereon, and a flexible band adapted to register the motion of the index along the scale, substantially as described.

2. In a calculating-machine, in combination, a logarithmic scale, an index movable thereon, and a flexible band adapted to register the motion of the index along the scale, substantially as described.

3. In a calculating-machine, in combination, a logarithmic scale arranged on a succession of lines, an index movable along the lines of the scale, and an endless band adapted to register the motion of the index along the lines of the scale, substantially as described.

4. In a calculating-machine, a logarithmic scale arranged on a succession of lines, an index movable along the lines, and across the lines of the scale, an endless band adapted to register the motion of the index along the lines of the scale, and means adapted to register the motion of the index across the lines of the scale, substantially as described.

5. In a calculating-machine, in combination, an index $b$, a registering-band $h$, and means for connecting or disconnecting the index and registering-band, substantially as described.

6. In a calculating-machine, in combination, a logarithmic scale, an index movable thereon, an endless band adapted to register, either directly or reversely, the motion of the index along the scale, substantially as described.

In testimony whereof I have signed my name to this specification in the presence of two subscribing witnesses.

AARON E. BERGEY.

Witnesses:
GEORGE M. NEUMYER,
GEORGE B. LEWIS.